(12) United States Patent
Carboni et al.

(10) Patent No.: US 12,313,220 B2
(45) Date of Patent: May 27, 2025

(54) ROTARY MACHINE WITH RECIRCULATING OIL LUBRICATION SYSTEM

(71) Applicant: AZIONARIA COSTRUZIONI MECCANICHE AUTOMATICHE A.C.M.A. S.P.A., Bologna (IT)

(72) Inventors: Salvatore Carboni, Bologna (IT); Antonio Vitali, Bologna (IT)

(73) Assignee: AZIONARIA COSTRUZIONI MECCANICHE AUTOMATICHE A.C.M.A. S.P.A., Bologna (IT)

( * ) Notice: Subject to any disclaimer, the term of this patent is extended or adjusted under 35 U.S.C. 154(b) by 77 days.

(21) Appl. No.: 17/996,429

(22) PCT Filed: Jul. 6, 2021

(86) PCT No.: PCT/IB2021/056042
§ 371 (c)(1),
(2) Date: Oct. 17, 2022

(87) PCT Pub. No.: WO2022/009087
PCT Pub. Date: Jan. 13, 2022

(65) Prior Publication Data
US 2023/0220952 A1    Jul. 13, 2023

(30) Foreign Application Priority Data

Jul. 9, 2020  (IT) .......... 102020000016636

(51) Int. Cl.
*F16N 7/40*    (2006.01)
*B65B 29/02*    (2006.01)
(Continued)

(52) U.S. Cl.
CPC .............. *F16N 7/40* (2013.01); *B65B 29/022* (2017.08); *B65B 35/46* (2013.01);
(Continued)

(58) Field of Classification Search
CPC ............. F16N 7/40; F16N 21/00; F16N 31/00
See application file for complete search history.

(56) References Cited

U.S. PATENT DOCUMENTS

| 5,330,335 A | * | 7/1994 | Teracuhi | .............. F04C 29/025 418/55.6 |
| 2023/0220952 A1 | * | 7/2023 | Carboni | .................. F16N 31/00 184/6 |

FOREIGN PATENT DOCUMENTS

| DE | 7326947 U | 10/1973 |
| EP | 1486450 A1 | 12/2004 |

(Continued)

OTHER PUBLICATIONS

International Search Report and Written Opinion for International Application No. PCT/IB2021/056042 filed on Jul. 6, 2021 on behalf of Azionaria Construzioni Macchine Automatiche Mail Date: Oct. 1, 2021 10 pages.

*Primary Examiner* — Henry Y Liu
*Assistant Examiner* — Mark K Buse
(74) *Attorney, Agent, or Firm* — Steinfl + Bruno LLP (57) ABSTRACT

A rotary machine includes a fixed internal body, a rotating external body and a lubrication system to lubricate one or more components of the internal body or external body during rotation. The lubrication system includes: an inlet conduit for a lubricant, formed in the internal body; one or more distribution conduits for the lubricant; a lubricant collection chamber between the external body and the internal body; and an outlet conduit communicating with the collection chamber.

20 Claims, 3 Drawing Sheets

(51) Int. Cl.
 *B65B 35/46* (2006.01)
 *F16C 33/66* (2006.01)
 *F16N 21/00* (2006.01)
 *F16N 31/00* (2006.01)

(52) U.S. Cl.
 CPC .......... *F16C 33/6685* (2013.01); *F16N 21/00* (2013.01); *F16N 31/00* (2013.01)

(56) References Cited

FOREIGN PATENT DOCUMENTS

| | | | |
|---|---|---|---|
| EP | 2522867 | A1 | 11/2012 |
| FR | 2229885 | * | 12/1974 |
| FR | 2229885 | A1 | 12/1974 |
| JP | H0540623 | * | 6/1993 |
| JP | H0540623 | U | 6/1993 |
| WO | 2022/009087 | A1 | 1/2022 |

* cited by examiner

ROTARY MACHINE WITH RECIRCULATING OIL LUBRICATION SYSTEM

CROSS REFERENCE TO RELATED APPLICATIONS

The present application is the US National Stage of International Patent Application No. PCT/IB2021/056042, filed on Jul. 6, 2021, which in turn, claims priority to Italian Application No. IT 102020000016636, filed on Jul. 9, 2020.

The present invention relates to a rotary machine provided with a recirculating oil lubrication system which enables operating with a low lubricant content within the rotary machine.

It also concerns a method for lubricating a rotary machine by means of a recirculating oil lubrication system.

The present invention finds a preferred, though not exclusive, application in the mechanical field of the construction of machines comprising an internal body, which is fixed and an external body, which extends about the internal body to be rotated about the same.

Machines of this type are widely used in many industrial sectors, for example to move objects from one station to another in a working plant, or to allow a working to be carried out while they are still rotating, or to rotate working tools.

By way of example, rotary machines of the type indicated above are advantageously used in the movement of semi-finished products in the packing and wrapping sector.

In order to ensure their correct functioning, the rotary machines may need to be lubricated at the components, such as bearings and bushings, which, in the rotation movement of the external body with respect to the internal body, slide against each other.

In this description as well as in the accompanying claims, certain terms and expressions are deemed to have, unless otherwise expressly indicated, the meaning expressed in the following definitions.

The term "rotary machine" means a mechanical apparatus in which a first body is rotated, at least partially, about a second body of the apparatus, through which a rotation axis of the first body extends. Preferably, the first body is supported on the second body and, even more preferably, the second body is fixed with respect to the rotation axis.

Preferred examples of rotary machines are drums, wheels, carousels, conveyors and other similar material movement apparatuses.

"Vertical" direction means a direction which is parallel to the force of gravity, while "horizontal" direction means any direction in a plane perpendicular to the vertical direction.

Consistently, the position of an element is defined as "lower" or "bottom" or "higher" or "upper" with respect to the position of another element with reference to the aforesaid vertical direction.

With reference to a movement direction, such as for example a rotation direction, a first element is said "downstream" with respect to a second element, when a body that performs this movement first encounters the first element and then the second element.

Similarly, a first element is said "upstream" with respect to a second element, when a body that performs this movement first encounters the second element and then the first element.

An element is inclined "downstream" with respect to a movement direction, such as for example a rotation direction, when it is inclined along a direction having a component directed in a direction which is concordant with the movement direction.

Similarly, an element is inclined "upstream" with respect to a movement direction, such as for example a rotation direction, when it is inclined along a direction having a component directed in a direction against the movement direction.

"Radial direction" means a direction that is substantially perpendicular to a rotation axis.

A first direction is said "substantially" perpendicular to a second direction when they are inclined to each other through an angle between 80° and 100°.

Similarly, two directions are said "substantially" parallel when they are inclined to each other as far as a maximum of 10°.

The term "component" of a first direction with respect to a second direction means the orthogonal projection of the first direction onto the second direction, when both directions are made coplanar.

"Lubricant" or "lubricating oil" or simply "oil" means a substance in a liquid state at the temperature of use, which is normally used for the lubrication of mechanical components, having a sufficiently low viscosity to be conducted along a lubrication circuit. This substance is typically based on mineral oil with appropriate additives, but can also have a different polymer base, e.g. silicone.

The Applicant has preliminarily noted that the type of lubrication system used in a rotary machine can become a critical element not only during the normal operation of the machine but also in the effective management of the maintenance operations thereof.

In particular, the Applicant has observed that in rotary machines of the type indicated above, in which an external body is rotated about a fixed internal body, the lubrication systems proposed by the prior art can substantially be divided into two families, which differ in the type of lubricant used.

A first family provides for the use of grease, which is applied directly to the parts in mutual contact and left there during the operation of the machine.

However, the Applicant has verified that this solution makes the grease change operation particularly onerous and problematic, which, with a certain frequency, requires the machine to be stopped and the components of the machine subjected to lubrication to be disassembled, which must be carefully cleaned before being greased again. Operations of this type therefore require long downtimes which, in order not to compromise the overall production of the plant in which they are inserted, often force the rotary machine undergoing maintenance to be replaced by a similar replacement machine, with consequent increase in costs.

In addition, the use of grease as a lubricating substance is ill-suited to machines that rotate at high speeds and, in the case of food production plants, the greases that can be used in this type of processing are not always of satisfactory quality.

The second family of lubrication systems provides for the use of oil, which, in its most common and simple mode of use, requires the components to be lubricated to be at least partially immersed in an oil bath.

However, the Applicant has observed that this system also entails numerous drawbacks, including the fact of having to provide a significant quantity of oil inside the machine and the fact that, over time, it can give rise to sealing problems, with consequent possible leaks of lubricant. This last drawback is particularly undesirable in machines dedicated to the production of foodstuffs and, at the same time, more frequent in high-speed rotary machines, where, due to the inevitable internal friction, high temperatures can develop which favour the action of wear on the sealing gaskets.

The Applicant also observed that both lubrication systems briefly mentioned above have certain common drawbacks, such as for example the impossibility of checking that the lubricant is actually present on all the necessary surfaces, especially in the case of high rotation speeds.

The Applicant has therefore understood that to solve the aforementioned drawbacks, it would be useful to use a recirculating oil lubrication system, in which the lubricant is conducted inside the machine directly in the region of the components intended to be lubricated and then collected and collected outside the machine where it is recirculated by a special pump.

Despite some undeniable advantages of this system, such as the possibility to pressurize the oil introduced into the machine, to inject it with precision in the predefined spots and, last but not least, the possibility to cool and clean the circulating lubricant before bringing it back into the machine, the Applicant, however, has found that in a rotary machine of the type described above, the implementation of such a recirculating oil lubrication system presents some serious difficulties, which are linked to the need to collect the lubricant downstream of the components intended to be lubricated and to conduct it continuously and effectively towards the outside of the rotary machine.

These difficulties become particularly evident when the machine has a horizontal rotation axis.

Having found that the lubricant downstream of the components intended to be lubricated tends, due to the effect of gravity, to gather on the lower part of the rotary machine, the Applicant has in fact verified that in the rotary machines with a horizontal rotation axis the lubricant gathers in the interspace between the internal body, which is fixed and the external body, which is rotating.

However, the Applicant has verified that allowing the lubricant to pass through the external body (e.g. through suitable slots) to be collected in a casing fixed in a radially external position would lead to additional difficulties in terms of the tightness of the casing on the rotating body.

The Applicant has therefore found that the lubricant can be conducted back outside the rotary machine through an outlet conduit formed directly on the internal body, which is fixed, thus avoiding the need to provide for lubricant collection structures positioned fixed around the rotating external body.

In a first aspect thereof, therefore, the present invention is directed to a rotary machine comprising an internal body and an external body.

Preferably, said internal body extends about a main rotation axis of said rotary machine.

Preferably, said internal body is fixed with respect to said main rotation axis.

Preferably, said external body is rotatably supported in a radially external position about said internal body.

Preferably, said external body is arranged to be rotated about said main rotation axis.

Preferably, said rotary machine comprises a lubrication system which is provided to lubricate at least one component of said internal body or said external body during the rotation of said external body about said internal body.

Preferably, said lubrication system comprises an inlet conduit for a lubricant which is provided to conduct the lubricant into said rotary machine.

Preferably, said inlet conduit is formed in said internal body.

Preferably, said lubrication system comprises at least one distribution conduit for a lubricant which is provided to conduct the lubricant from said inlet conduit as far as said at least one component which is intended to be lubricated.

Preferably, said lubrication system comprises a collection chamber for the lubricant which is provided to collect the lubricant downstream of said component which is intended to be lubricated.

Preferably, said collection chamber is defined between said external body and said internal body.

Preferably, said lubrication system comprises an outlet conduit which is provided to conduct the lubricant outside said rotary machine.

Preferably, said outlet conduit communicates with said collection chamber.

Preferably, said outlet conduit is formed in said internal body.

Thanks to these features, therefore, the rotary machine of the present invention can be lubricated using a recirculating oil lubrication system, overcoming the traditional grease or oil bath lubrication systems and thus being able to achieve the important advantages in terms of maintenance and lubrication efficiency described above.

In a second aspect thereof, the present invention relates to a method for lubricating a rotary machine comprising an internal body which is fixed and an external body which rotates about a main rotation axis of the rotary machine.

Preferably, the method comprises the step of introducing a lubricant into said rotary machine through an inlet conduit which is formed in said internal body.

Preferably, the method comprises the step of distributing said lubricant through a distribution conduit.

Preferably, the method comprises the step of collecting said lubricant in a defined collection chamber which is defined between said internal body and said external body.

Preferably, the method comprises the step of discharging the lubricant from said rotary machine through an outlet conduit which is formed in said internal body and which communicates with said collection chamber.

In a third aspect thereof, the present invention relates to an apparatus comprising at least one rotary machine made according to the aforesaid first aspect.

Preferably, said inlet conduit of the lubricant and said outlet conduit of the lubricant of said at least one rotary machine are connected to a collection tank for the lubricant which is external with respect to said rotary machine.

Preferably, said inlet conduit of the lubricant and said outlet conduit of the lubricant of said at least one rotary machine are connected to a pumping device for the lubricant which is external with respect to said rotary machine.

Thanks to these features, the apparatus according to the present invention can lubricate a rotary machine of the type described above by means of a recirculating oil lubrication system in which the lubricant is conducted along a circuit which starts from a tank which is external with respect to the rotary machine and returns to the tank after having passed inside the rotary machine for the necessary lubrication operations.

The present invention, in at least one of the aforesaid aspects, may have at least one of the further preferred features set out below.

In a preferred embodiment of the invention, said outlet conduit communicates with said collection chamber by means of an intake channel which is formed in said internal body and which opens into said collection chamber.

Preferably, said lubricant is rotated in the collection chamber by means of the rotation of said external body about said main rotation axis.

Preferably, said lubricant is discharged from said rotary machine through said outlet conduit by diverting a portion of said lubricant which is rotated, by means of said intake channel.

Preferably, said intake channel is formed to abut the lubricant which is present in said collection chamber and which is rotated by said external body so as to divert it towards said outlet conduit.

Thanks to these characteristics, some of the lubricant which is rotated in the collection chamber is thus diverted from the main flow thereof and guided towards the outlet conduit.

The provision of this characteristic advantageously allows to overcome in a simple and effective way an important drawback which can be found in a rotary machine of the type indicated above.

This drawback derives from the possible difficulty of letting the lubricant enter the so outlet conduit, due to the fact that the external body, by rotating about the internal body, tends to rotate the lubricant and, due to the effect of the centrifugal force, to move it away from the internal body where the outlet conduit is formed.

This situation hinders the outflow of the lubricant towards the outlet conduit, with the consequent risk of disengagement of the circulation pump of the lubricant.

On the other hand, the provision of a specially formed intake channel to abut and divert a portion of the lubricant which is present in the collection chamber makes it possible to guarantee adequate outflow of the lubricant exiting the rotary machine even during the rotation of the external body about the internal body, by exploiting the speed with which the lubricant is rotated by the external body to push it along the outlet conduit.

It will be noted that, thanks to this characteristic, the solution to the problem is derived from the same cause that determines it, thus obtaining, among others, the obvious advantage of adapting the response to the problem to the extent of the problem itself.

In other words, the greater the rotation speed of the external body (and therefore the centrifugal force that hinders the outflow of the oil), the greater the speed of the oil which is diverted inside the intake channel and which is pushed towards the outlet conduit.

As an alternative, or in addition, to the provision of the intake channel as described above, pneumatic means may be provided to push the lubricant from the collection chamber towards the outlet conduit.

Preferably, said main rotation axis is horizontal.

Preferably, said intake channel is formed in a lower region of said internal body.

Preferably, said intake channel is formed at a lower position than said outlet conduit.

Preferably, said intake channel is formed in said internal body so as to be below a predefined level of lubricant when said external body is not rotating.

In this way, the intake channel constitutes a small lubricant tank which is useful for allowing the correct operation of the lubrication system in the starting step of the rotating machine.

In a preferred embodiment, said intake channel comprises a first inlet branch which opens into said collection chamber.

Preferably, said first inlet branch is delimited by a first wall which is positioned upstream of said first inlet branch with respect to the rotation direction of the external body about said main rotation axis.

Preferably, said first inlet branch is delimited by a second wall which is positioned downstream of said first inlet branch with respect to the rotation direction of the external body about said main rotation axis.

Preferably, said second wall is inclined upstream with respect to the rotation direction of the external body about said main rotation axis.

In this way, the lubricant which hits the second wall is advantageously diverted towards the inside of the first inlet branch of the intake channel.

Preferably, said second wall is incident with an external surface of said internal body delimiting said collection chamber.

Preferably, said second wall is inclined with respect to a radial direction which is defined in said rotary machine, forming an angle between 45° and 80° with an external surface of said internal body delimiting said collection chamber.

Thanks to these characteristics, the diverting action of the lubricant flow carried out by the second wall is optimized.

Preferably, said first wall is inclined upstream with respect to the rotation direction of the external body about said main rotation axis.

In this way, the entry of the lubricant into the intake channel is favoured.

Preferably, said first wall is substantially connected to an external surface of said internal body delimiting said collection chamber.

In this way, possible turbulence phenomena of the lubricant flow in the immediate vicinity of the first wall are reduced, further favouring the lubricant entry into the intake channel.

Preferably, said first inlet branch has a tapered passage section from the opening in said collection chamber towards the inside of said intake channel.

In this way, the first inlet branch has a substantially funnel-shaped section.

Preferably, said first inlet branch in the region of said opening in the collection chamber has a circumferential dimension between 30 and 40 mm.

Preferably, said first inlet branch narrows away from said collection chamber as far as a circumferential dimension between 10 and 30 mm.

Preferably, said intake channel comprises a second inlet branch which opens into said collection chamber.

This increases the amount of lubricant which is diverted into the intake channel.

Preferably, said second inlet branch is connected to said first inlet branch.

Preferably, said second inlet branch is connected to said first inlet branch by means of a connection portion, which extends between said first and second inlet branch along a substantially circumferential direction.

Preferably, said connection portion extends between said first and second inlet branch in an upper position with respect to the same and is interposed between said first and second inlet branch and said outlet conduit.

In this way, the connection portion acts as a tank in which the lubricant from the two inlet branches is equalised before being sent to the outlet conduit.

In a preferred embodiment, said second inlet branch is substantially identical to said first inlet branch.

Preferably, said second inlet branch is positioned at the opposite side to said first inlet branch with respect to a vertical plane which extends through said main rotation axis.

In this way, the lubricant is diverted towards the intake channel from two locations as far apart as possible, while remaining substantially at the same elevation with respect to the horizontal plane, and therefore with respect to the lubricant level when the rotary machine is at rest.

Preferably, said outlet conduit comprises a first branch which extends from said intake channel in a direction having at least one vertical component.

Preferably, said first branch extends from said intake channel in a radial direction.

Preferably, said outlet conduit comprises a second branch which extends from said intake channel in order to be joined to said first branch in the region of a common portion of said outlet conduit.

Preferably, said second branch is substantially symmetrical to said first branch with respect to a vertical plane that extends through said main rotation axis.

Preferably, in the region of said collection chamber the spacing of said internal body and said external body is between 2 and 6 mm, more preferably approximately 3 mm.

Preferably, said apparatus comprises a plurality of rotary machines which are realised according to the aforesaid first aspect.

Preferably, said collection tank for the lubricant is common to all rotary machines of said plurality.

Preferably, said pumping device for the lubricant is common to all rotary machines of said plurality.

Preferably, said apparatus is an apparatus for packing articles.

Preferably, said rotary machine is a drum for moving semi-finished products.

The characteristics and advantages of the invention will become clearer from the detailed description of an embodiment illustrated, by way of non-limiting example, with reference to the appended drawings wherein.

Figure 1:
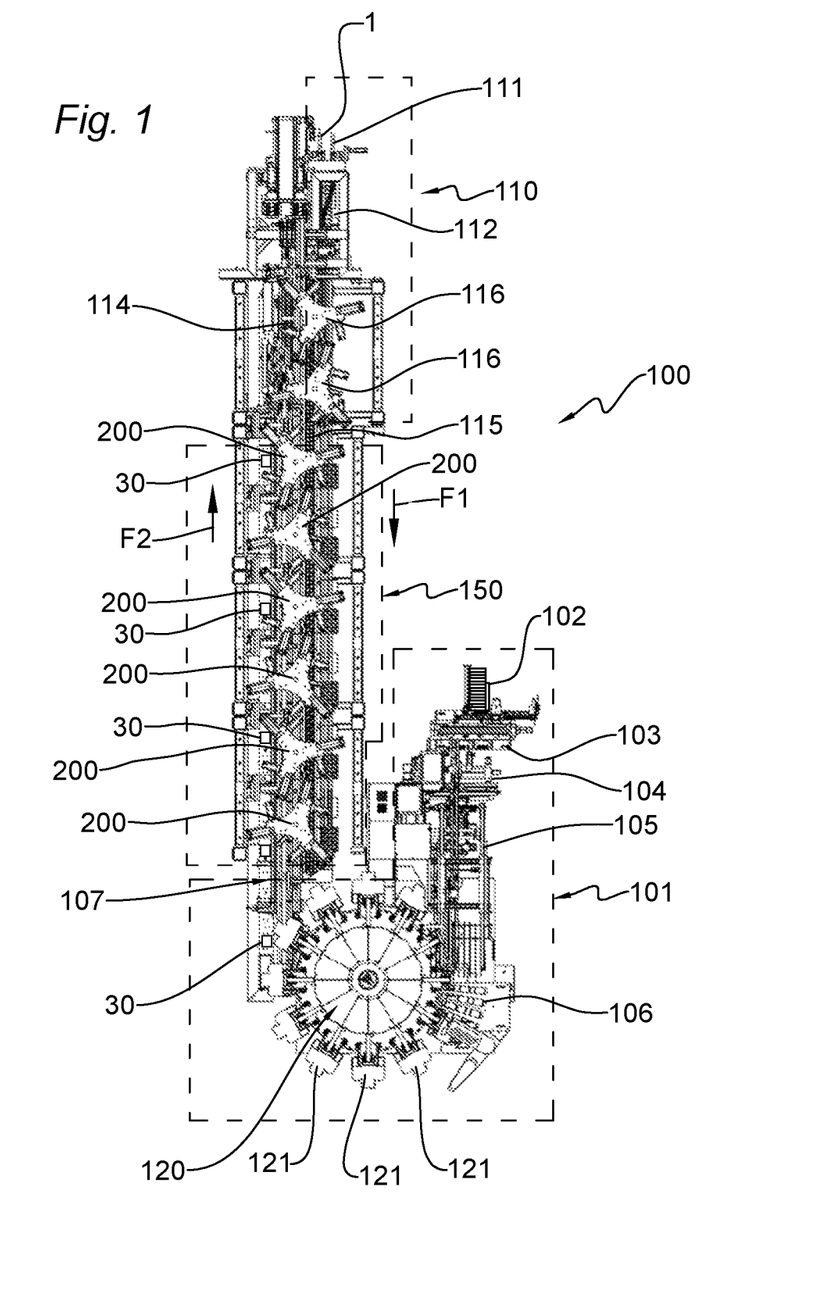
FIG. 1 is a schematic plan view from above of an apparatus for packing articles, which is provided with rotary machines which are realised in accordance with the present invention.

With initial reference to FIG. 1, 100 denotes as a whole a packing apparatus provided with rotary machines 10 which are realised in accordance with the present invention.

The packing apparatus 100 is provided to pack a plurality of articles 1, which are loose, within boxes 30, so as to prepare a finished packaging, ready for final packaging and subsequent shipment.

The articles 1 are, in this preferred embodiment example, capsules for the production of drinks by infusion, in particular coffee.

The packing apparatus 100 comprises, in its most general units, a forming unit 101 of the boxes 30, a sorting unit 110 of the articles 1, and a packing unit 150, in which the articles 1 coming from the sorting line 110 are deposited in the boxes 30 coming from the forming line 101.

The sorting unit 110 is supplied with articles 1 from a first conveyor 111, which transports two rows of articles 1 in upright position, and comprises a first sorting station 112, comprising for example a pair of screw conveyors, in which the articles 1 of the two rows of articles are correctly spaced apart from one another and the articles 1 of one of the two rows is upturned in upturned position.

The articles 1 exiting the first sorting station 112 are then supplied to a second sorting station 114 which, thanks to the action of a pair of sorting robots 116, takes care of transferring the articles 1 onto a first conveyor belt 115 while arranging them according to a predefined removal pattern, for example a chequered pattern.

In the packing unit 150, the articles 1 which are transported on the first conveyor belt 115 are transferred and deposited in the boxes 30 coming from the forming unit 101, in particular, transported on a second conveyor belt 107.

This operation is carried out thanks to a plurality of transfer devices 200, each of which is provided to remove a plurality of articles 1 from the first conveyor belt 115 and deposit them in a box 30.

Advantageously, in the region of the packing unit 150, the first conveyor belt 115 and the second conveyor belt 107 are side-by-side and are linearly moved along respective advance directions F1 and F2, which are substantially parallel but in opposite direction, while the transfer devices 200 are aligned between the first conveyor belt 115 and the second conveyor belt 107.

The boxes 30 in which the articles 1 are deposited are formed in the forming unit 101 from corresponding blanks 31, each of which consists of a flat semi-finished product made of foldable and semi-rigid material, for example cardboard, suitably cut and provided with folding creased portions.

The forming unit 101 includes a supply station 103, in which the single blanks 31 are extracted from a stack of blanks which is supplied at an inlet 102, and are then subjected to a process of pre-folding some of the flaps thereof before being transferred to a blanks conveyor 105.

The blanks conveyor 105 crosses a gluing station 106, wherein a plurality of hot glue dispensing guns or nozzles lay suitable glue spots on the blanks 31.

The forming unit 101 further comprises a forming carousel 120 which is supplied by the blanks conveyor 105 which is provided with a plurality of forming devices 121. In the travel period of a portion of the curved tract of the forming carousel 120, the blanks 31 are suitably folded within the forming devices 121 so that the portions provided with glue spots are made to adhere to each other and to form respective boxes 30 having a respective upper closing panel in an open position.

At the end of the curved tract of the forming carousel 120, the boxes 30 are supplied, with the opening facing upwards, onto the second conveyor belt 107 where they are sent to the packing unit 150 described above.

As mentioned above, several rotary machines can be identified in the packing apparatus 100.

Figure 2:
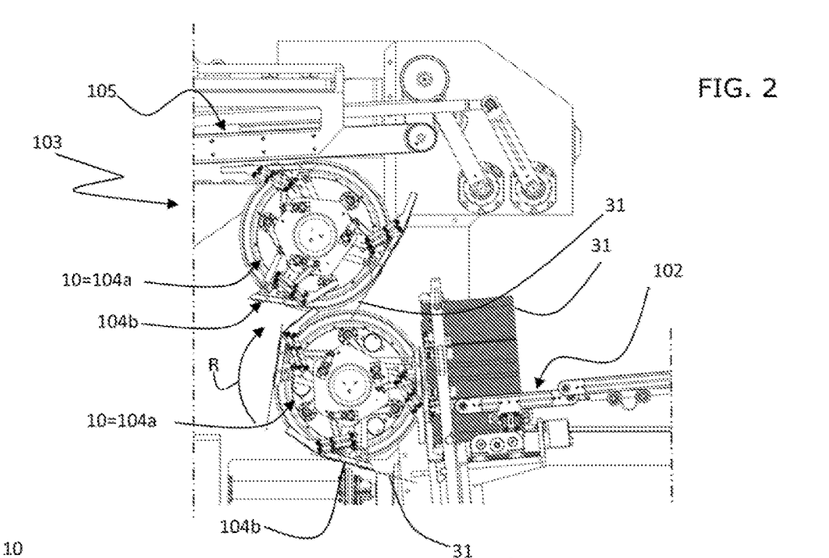
FIG. 2 is a schematic side elevation view and on enlarged scale of a portion of the packing apparatus of FIG. 1, illustrating the rotary machines in greater detail.

In particular, in the supply station 103, illustrated in greater detail in FIG. 2, there is a pair of movement drums 104a each one bearing, in a radially external position, a plurality of gripping devices 104b which are suitable to retain a respective blank 31 and to move it between the various processing and pre-folding stations until it is deposited on the blanks conveyor 105.

Each movement drum 104a can be identified as the rotary machine 10 of the present invention and will be referred to as such in the following description.

Figure 3:
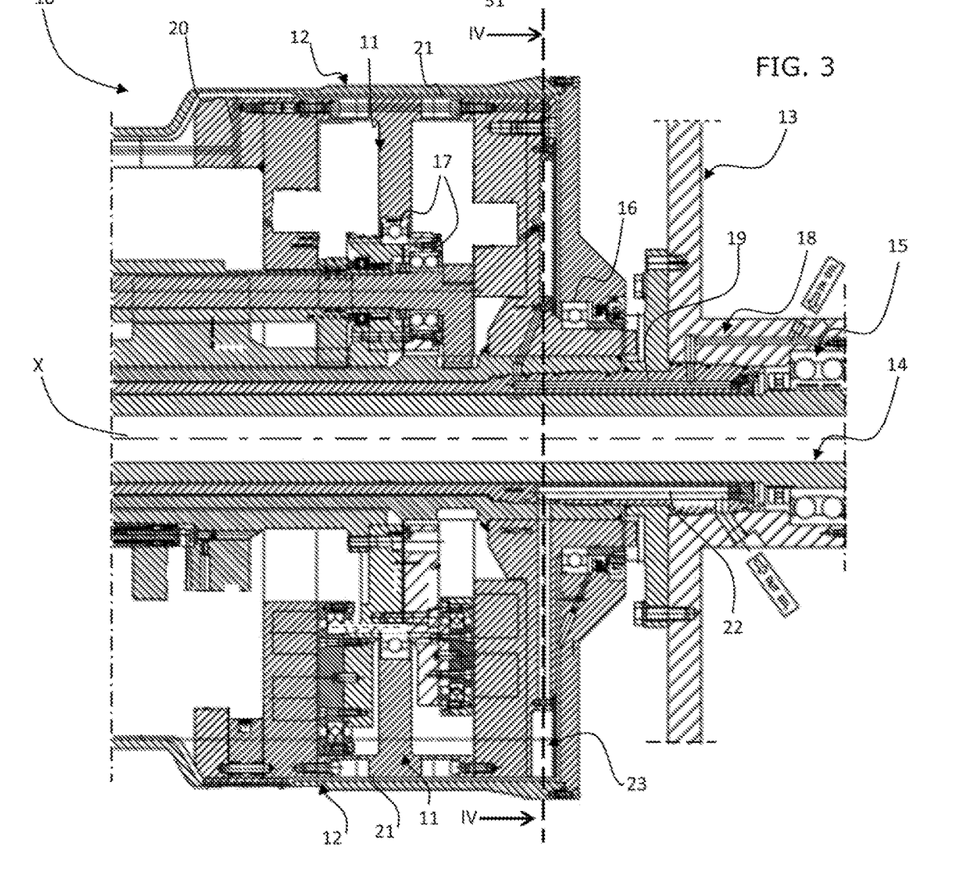
FIG. 3 is a schematic longitudinal sectional view of a significant portion of a rotary machine of FIG. 2.
Figure 4:
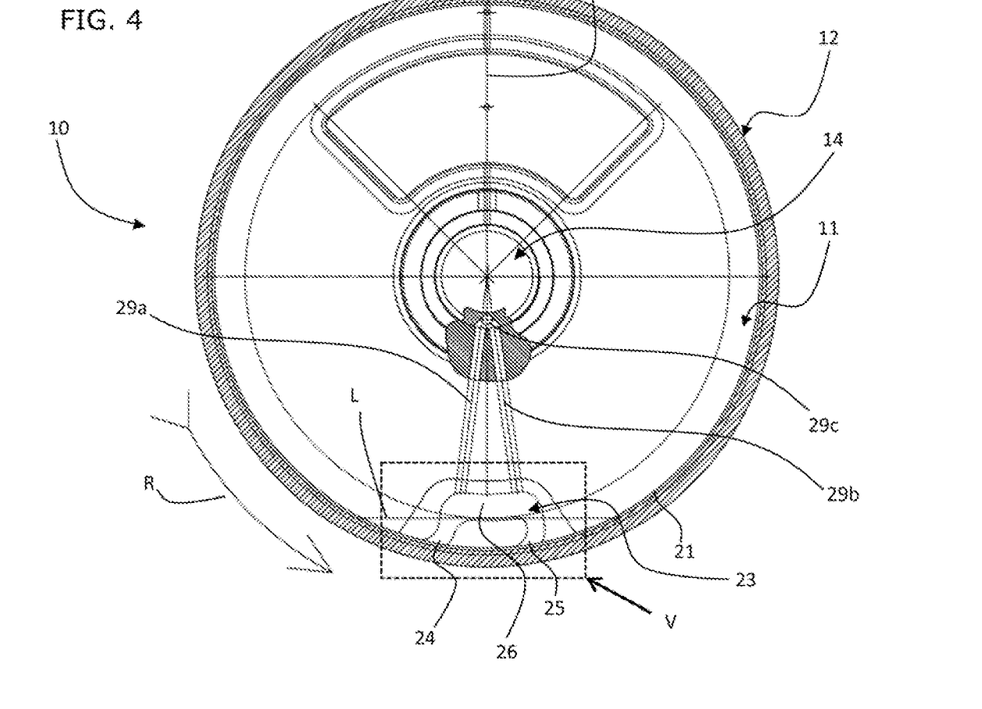
FIG. 4 is a schematic sectional view along the radial plane indicated by IV-IV in FIG. 3.

With particular reference to FIGS. 3 and 4, each rotary machine 10 comprises an internal body 11 and an external body 12 which is rotatably supported in a radially external position about the internal body 11.

In particular, the external body 12 is provided to be rotated about a main rotation axis X of the rotary machine 10, in a rotation direction R, while the internal body 11 extends about the main rotation axis X, but is fixed with respect to the same.

In particular, the internal body 11 is fixed to a supporting structure 13 of the rotary machine 10, and a shaft 14 extends therein, which is rotatably supported to the supporting structure 13 by means of a bearing 15.

The shaft 14 is located on a horizontal plane and the longitudinal axis thereof defines the main rotation axis X of the rotary machine 10.

The external body 12 is supported on the internal body 11 by means of bearings 16 and inside the internal body 11 there are other bearings or rotary devices all marked with 17, which are provided to control the correct movement of the gripping devices 104*b* and which are illustrated schematically in FIG. 3.

The radial dimensions of the rotary machine 10 provide for diameters of the external body 12 and the internal body 11 between 500 and 800 mm, for example in the so embodiment described in detail herein, the external body 12 has an external diameter of approximately 650 mm and an internal diameter of approximately 630 mm, while the internal body 11 has an external diameter of approximately 624 mm, so that the spacing in the radial direction between the internal body 11 and the external body 12 is approximately 3 mm.

Each rotary machine 10 comprises a respective motor member, not shown in the figures, which is provided to rotate the external body 12 about the main rotation axis X. In particular, the external body 12 is rotated at a speed between 4 and 50 rpm.

Each rotary machine 10 comprises a lubrication system 18, which is provided to lubricate all parts of the rotary machine 10 which are rotating in contact with fixed parts, including at least the bearings 15, 16 and 17, during rotation of the external body 12 about the internal body 11.

The lubricant is a liquid substance of any composition suitable for the purpose, e.g. mineral oil-based.

The lubrication system 18 of each rotary machine 10 comprises:
- an inlet conduit 19, through which the lubricant is introduced into the rotary machine 10,
- a distribution conduit 20, which is provided to conduct the lubricant from the inlet conduit 19 at least as far as the bearings 15, 16 and 17,
- a collection chamber 21, which is defined between the internal body 11 and the external body 12 to collect the lubricant downstream of the bearings 15, 16 and 17, and
- an outlet conduit 22, through which the lubricant is brought outside the rotary machine 10.

The inlet conduit 19, the distribution conduit 20 and the outlet conduit 22 are all formed in the fixed portion of the rotary machine, in particular in the internal body 11 and in the supporting structure 13 to which it is secured.

The collection chamber 21 is defined by the space between the internal body 11 and the external body 12 and, as can be seen from the foregoing, it has a radial measurement between 2 and 6 mm, for example approximately 3 mm.

An intake channel 23, which is open into the collection chamber 21 and which communicates with the outlet conduit 22, is also formed in the internal body 11.

The intake channel 23 is positioned in the region of the internal body having the lowest elevation with respect to the vertical direction and, in particular, is preferably positioned below a level L of lubricant which is present in the rotary machine 10 when it is at rest.

The intake channel 23 is formed to abut the lubricant which is present in the collection chamber 21, while it is rotated by the external body 12, so as to divert it towards the outlet conduit 22.

For this purpose, the intake channel 23 comprises a first and second inlet branch 24 and 25, which are open into the collection chamber 21, and a connection portion 26, which connects the first and second inlet branch 24 and 25 to each other at the opposing side to the collection chamber 21.

The first and second inlet branch 24 and 25 are spaced apart from each other and, in particular, are positioned at the opposite side with respect to a vertical plane Y, which contains the main rotation axis X.

Figure 5:
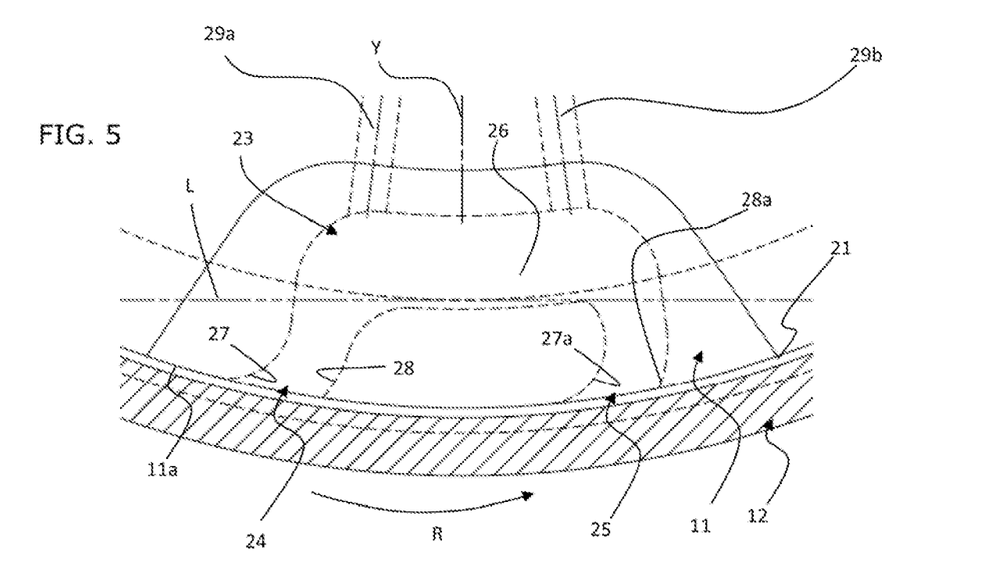
FIG. 5 is a schematic view on enlarged scale of the portion of FIG. 4 indicated by V.

Moreover, the first and second inlet branch 24 and 25 are substantially identical between them, so that in the following only the first inlet branch 24 will be described in detail, it being understood that similar considerations are immediately repeatable also for the second inlet branch 25. For clarity's sake, the elements of the second inlet branch 25 analogous to the first inlet branch 24 are shown in FIG. 5 with the same numbers as the first inlet branch 24 with the addition of the letter "a".

With reference to the rotation direction R of the external body 12 about the main rotation axis X, the first inlet branch 24 comprises a first and a second wall 27 and 28, which delimit the first inlet branch 24 upstream and downstream, respectively.

Both the first and second wall 27 and 28 are inclined upstream with respect to the rotation direction R, so as to favour the entry of the rotated lubricant. However, they have different conformations to better meet this function.

The first wall 27, in fact, is substantially connected to an external surface 11*a* of the internal body 11 which delimits the collection chamber 21, while the second wall 28 is substantially incident with the external surface 11*a*, forming with it an angle between 45° and 80°, for example of approximately 60°.

The intake channel 23 has, in a direction parallel to the main rotation axis X, a substantially constant measurement of, for example, approximately 20 mm.

The first inlet branch 24 has a tapered passage section from the opening thereof in the collection chamber 21 towards the inside of the intake channel 23.

In particular, the first inlet branch 24 has, in the region of the opening in the collection chamber 21, a circumferential dimension between 30 and 40 mm, for example of approximately 35 mm, and then narrows towards the inside of the intake channel 23 as far as a circumferential dimension between 10 and 30 mm, for example of approximately 20 mm.

After approximately 30 to 40 mm, the first and second inlet branch 24, 25 lead into the connection portion 26, which extends in a substantially circumferential direction, being interposed between the first and second inlet branch 24, 25 and a first and second branch 29*a*, 29*b* of the outlet conduit 22.

The first and second branch 29*a*, 29*b* of the outlet conduit 22 are substantially symmetrical to each other with respect to the vertical plane Y and extend in respective radial directions as far as a common portion 29*c* of the outlet conduit 22, where they converge and are joined into a single flow.

In particular, the first and second branch 29a, 29b are holes with a diameter for example between 10 and 15 mm, e.g. approximately 12 mm and approximately 150 to 200 mm long.

During the rotation of the external body 12 about the main rotation axis X, and thus about the internal body 11, the lubricant introduced into the rotary machine 10 through the inlet conduit 19 and the distribution conduit 20, reaches the collection chamber 21 where, also as a consequence of the reduced radial dimension thereof, it is rotated by the external body 12 in the rotation direction R.

When it arrives at the region the first or second inlet branch 24, 25, a portion of the lubricant hits against the respective second wall 27, 27a, and, due to their inclination, is diverted towards the inside of the intake channel 23, as far as the connection portion 26.

Here the lubricant from the two inlet branches 24 and 25 is joined, equalising the fluodynamic properties, and, exploiting its residual kinetic energy, is guided into the branches 29a, 29b of the outlet conduit 22, to exit the rotary machine 10.

A lubricant suction pump can be provided downstream of the outlet conduit 22, outside the rotary machine 10.

In this way, the continuity of operation of the recirculating oil lubrication system of the rotary machine 10 is ensured, avoiding the possible disengagement of the lubricant suction and recirculation pump, and thus allowing the lubricant content inside the rotary machine 10 to be kept at a low level.

In the specific application described herein, wherein the rotary machine 10 represents a movement drum 104a of the packing apparatus 100, it is further advantageously envisaged that the respective lubrication systems 18 of each movement drum 104a (and thus of each rotary machine 10) are connected to a common collection tank for the lubricant and common pumping devices for the lubricant.

This greatly facilitates the lubricant change operation, as no disassembly of rotary machines is required.

Another advantage of the present invention lies in the substantial limitation of the possibility of lubricant leakage at the rotary machine thanks to the minimal lubricant content within the rotary machine.

In addition, the possibility of recirculating the lubricant outside the rotary machine also allows it to be cooled if necessary, so as to avoid excessively high temperatures inside the rotary machine, which can lead to damage to the sealing gaskets as well as to the mechanical components themselves.

Another advantage is that each single component can be lubricated precisely and reliably.

It goes without saying that a person skilled in the art may, in order to meet specific and contingent application requirements, make further modifications and variants of the above-described invention within the scope of protection as defined by the following claims.

The invention claimed is:

1. A rotary machine comprising:
   an internal body extending about a main rotation axis of said rotary machine, said internal body being fixed with respect to said main rotation axis,
   an external body rotatably supported in a radially external position about said internal body, said external body being configured to be rotated about said main rotation axis, and
   a lubrication system configured to lubricate at least one component of said internal body or said external body during rotation of said external body about said internal body, said lubrication system comprising:
      an inlet conduit for a lubricant, said inlet conduit being formed in said internal body and being configured to conduct the lubricant inside said rotary machine,
      at least one distribution conduit for the lubricant, said at least one distribution conduit being configured to conduct the lubricant from said inlet conduit to said at least one component,
      a lubricant collection chamber between said external body and said internal body and configured to collect the lubricant downstream of said at least one component, and
      an outlet conduit communicating with said collection chamber, the outlet conduit being formed in said internal body and being configured to conduct the lubricant outside said rotary machine,
   wherein said outlet conduit communicates with said collection chamber through an intake channel formed in said internal body and opening into said collection chamber, said intake channel being formed to abut the lubricant present in said collection chamber and rotated by said external body in order to divert the lubricant towards said outlet conduit,
   wherein said intake channel comprises a first inlet branch opening into said collection chamber and delimited by a first wall and a second wall,
   wherein said first wall and said second wall are respectively positioned upstream and downstream of said first inlet branch with reference to a rotation direction of the external body about said main rotation axis,
   wherein said second wall is inclined upstream with respect to the rotation direction of the external body about said main rotation axis, and
   wherein said first wall is inclined upstream with respect to the rotation direction of the external body about said main rotation axis.

2. The rotary machine according to claim 1, wherein said main rotation axis is a horizontal axis.

3. The rotary machine according to claim 1, wherein said intake channel is formed in a lower region of said internal body.

4. The rotary machine according to claim 1, wherein said second wall is inclined with respect to a radial direction defined in said rotary machine, said second wall forming an angle of 45° to 80° with an external surface of said internal body.

5. The rotary machine according to claim 4, wherein said intake channel comprises a second inlet branch opening into said collection chamber and connected to said first inlet branch.

6. The rotary machine according to claim 5, wherein said second inlet branch is positioned opposite to said first inlet branch with respect to a vertical plane extending through said main rotation axis.

7. An apparatus comprising:
   at least one rotary machine according to claim 1,
   a pumping device external to the at least one rotary machine and connected to the inlet conduit of the at least one rotary machine, and
   a lubricant collection tank external to the at least one rotary machine and connected to the outlet conduit of the at least one rotary machine.

8. The apparatus of claim 7, wherein
   the at least one rotary machine are a plurality of rotary machines, and said lubricant collection tank and said pumping device are common to all rotary machines of said plurality of rotary machines.

9. The apparatus according to claim 7, wherein said apparatus is an apparatus for packing articles.

10. A rotary machine comprising:
an internal body extending about a main rotation axis of said rotary machine, said internal body being fixed with respect to said main rotation axis,
an external body rotatably supported in a radially external position about said internal body, said external body being configured to be rotated about said main rotation axis, and
a lubrication system configured to lubricate at least one component of said internal body or said external body during rotation of said external body about said internal body, said lubrication system comprising:
an inlet conduit for a lubricant, said inlet conduit being formed in said internal body and being configured to conduct the lubricant inside said rotary machine,
at least one distribution conduit for the lubricant, said at least one distribution conduit being configured to conduct the lubricant from said inlet conduit to said at least one component,
a lubricant collection chamber between said external body and said internal body and configured to collect the lubricant downstream of said at least one component, and
an outlet conduit communicating with said collection chamber, the outlet conduit being formed in said internal body and being configured to conduct the lubricant outside said rotary machine,
wherein said outlet conduit communicates with said collection chamber through an intake channel formed in said internal body and opening into said collection chamber, said intake channel being formed to abut the lubricant present in said collection chamber and rotated by said external body in order to divert the lubricant towards said outlet conduit,
wherein said outlet conduit comprises a first branch extending from said intake channel in a direction having at least one vertical component, and
wherein said first branch extends from said intake channel in a radial direction.

11. The rotary machine according to claim 10, wherein said main rotation axis is a horizontal axis.

12. The rotary machine according to claim 10, wherein said intake channel is formed in a lower region of said internal body.

13. The rotary machine according to claim 10, wherein said intake channel comprises a first inlet branch opening into said collection chamber and delimited by a first wall and a second wall, wherein
said first wall and said second wall are respectively positioned upstream and downstream of said first inlet branch with reference to a rotation direction of the external body about said main rotation axis, and
said second wall is inclined upstream with respect to the rotation direction of the external body about said main rotation axis.

14. The rotary machine according to claim 13, wherein said second wall is inclined with respect to a radial direction defined in said rotary machine, said second wall forming an angle of 45° to 80° with an external surface of said internal body.

15. The rotary machine according to claim 13, wherein said intake channel comprises a second inlet branch opening into said collection chamber and connected to said first inlet branch.

16. The rotary machine according to claim 15, wherein said second inlet branch is positioned opposite to said first inlet branch with respect to a vertical plane extending through said main rotation axis.

17. The rotary machine according to claim 10, wherein said outlet conduit comprises a second branch extending from said intake channel and coupled to said first branch in a region of a common portion of said outlet conduit.

18. An apparatus comprising:
at least one rotary machine according to claim 10,
a pumping device external to the at least one rotary machine and connected to the inlet conduit of the at least one rotary machine, and
a lubricant collection tank external to the at least one rotary machine and connected to the outlet conduit of the at least one rotary machine.

19. The apparatus of claim 18, wherein
the at least one rotary machine are a plurality of rotary machines, and
said lubricant collection tank and said pumping device are common to all rotary machines of said plurality of rotary machines.

20. The apparatus according to claim 18, wherein said apparatus is an apparatus for packing articles.

* * * * *